United States Patent
Bushi et al.

(10) Patent No.: US 6,293,311 B1
(45) Date of Patent: Sep. 25, 2001

(54) MULTILAYER COMPOSITE PIPE FLUID CONDUIT SYSTEM USING MULTILAYER COMPOSITE PIPE AND METHOD OF MAKING THE COMPOSITE

(75) Inventors: John C. Bushi, Parma Heights; Girish T. Dalal, Avon Lake; Thomas L. Evans, Amherst; Andrew M. Olah, Spencer; Theodore J. Schmitz, Avon; Andrew L. Auvil, Brecksville; A. Donald Meltzer, Akron, all of OH (US); Stefanie Hahnen-Schroeder, Munchen Gladbach (DE); Anthony Kordecki, Berkel (NL)

(73) Assignee: PMD Holdings Corp., Brecksville, OH (US)

( * ) Notice: Subject to any disclaimer, the term of this patent is extended or adjusted under 35 U.S.C. 154(b) by 0 days.

(21) Appl. No.: 09/083,803

(22) Filed: May 22, 1998

(51) Int. Cl.[7] .................................................. F16L 11/04
(52) U.S. Cl. ..................... 138/138; 138/143; 138/DIG. 1
(58) Field of Search .................................. 138/138, 109, 138/137, 141, 143, DIG. 1

(56) References Cited

U.S. PATENT DOCUMENTS

| | | |
|---|---|---|
| 2,487,554 | 11/1949 | Hurst . |
| 2,646,822 | 7/1953 | Ferguson . |
| 3,093,160 | 6/1963 | Boggs . |
| 3,111,143 | 11/1963 | Frieder et al. ........................ 138/124 |
| 3,235,291 | 2/1966 | Jacoby . |
| 3,253,619 | 5/1966 | Cook et al. ........................... 138/125 |
| 3,295,557 | 1/1967 | Christiansen ........................ 138/125 |
| 3,335,758 | 8/1967 | Bertolet, Jr. . |
| 3,372,462 | 3/1968 | Reid et al. . |
| 3,417,786 | 12/1968 | Schnabel . |

(List continued on next page.)

FOREIGN PATENT DOCUMENTS

| | | |
|---|---|---|
| 686298 | 8/1961 | (CA) . |
| 1 955 618 | 11/1969 | (DE) . |
| 2 000 615 | 1/1970 | (DE) . |
| 2 017 433 | 4/1970 | (DE) . |
| 2 022 460 | 5/1970 | (DE) . |
| 2 034 488 | 7/1970 | (DE) . |
| 2017433 | 10/1971 | (DE) . |
| OS 24 42 419 | 3/1976 | (DE) . |
| 26 36 331 | 8/1976 | (DE) . |
| 27 03 850 | 1/1977 | (DE) . |

(List continued on next page.)

OTHER PUBLICATIONS

*Fire Protection Contractor*, 5/92 "Pressfit" fire protection system.
*Spears* CPVC Fire Sprinkler Pipe Products Weights & Dimensions, Nov. 1994.
"enviroTube" protective coated copper tubing, Lothar Dee Corp., Jan. 1994.
German Article dated May 29, 1998 on Composite Pipe.

*Primary Examiner*—James Hook
(74) *Attorney, Agent, or Firm*—Thoburn T. Dunlap; Nestor W. Shust; Valerie L. Calloway

(57) ABSTRACT

A multilayer composite pipe structure is described. The multilayer composite pipe comprises a hollow inner conduit, a first layer of adhesive, a metallic intermediate layer, a second layer of adhesive, as well as, the outer thermoplastic layer, respectively. The hollow inner conduit is made from any rigid thermoplastic material. The outer thermoplastic layer is made from a rigid, amorphous thermoplastic polymer. This multilayer composite pipe is pressure bearing. In one embodiment, the multilayer composite pipe is solvent cementable; whereas in another embodiment, the multilayer composite pipe is heat fusible. In still yet another embodiment of the invention, the multilayer composite pipe is bendable. Furthermore, the multilayer composite pipe can be used in a fluid conduit system with fittings with an optional insert.

21 Claims, 6 Drawing Sheets

U.S. PATENT DOCUMENTS

| | | | | |
|---|---|---|---|---|
| 3,422,856 | | 1/1969 | Hunter et al. . | |
| 3,502,492 | | 3/1970 | Spiller . | |
| 3,560,295 | | 2/1971 | Kimbrell et al. . | |
| 3,589,873 | * | 6/1971 | Poth | 138/143 |
| 3,598,156 | * | 8/1971 | Ulmer et al. | 138/143 |
| 3,678,811 | | 7/1972 | Penwell . | |
| 3,858,618 | | 1/1975 | Kaufman . | |
| 3,886,980 | | 6/1975 | Elson | 138/124 |
| 4,091,134 | | 5/1978 | Uemura et al. . | |
| 4,213,487 | * | 7/1980 | Funk et al. | 138/143 |
| 4,216,802 | | 8/1980 | Bonnes et al. . | |
| 4,277,091 | | 7/1981 | Hunter . | |
| 4,306,591 | | 12/1981 | Arterburn . | |
| 4,326,905 | | 4/1982 | Tanaka . | |
| 4,347,090 | | 8/1982 | Anderson . | |
| 4,390,489 | * | 6/1983 | Segal | 264/126 |
| 4,391,458 | | 7/1983 | Blakely . | |
| 4,400,019 | | 8/1983 | Fruck . | |
| 4,421,569 | | 12/1983 | Dichter et al. . | |
| 4,423,185 | * | 12/1983 | Matsumoto et al. | 525/66 |
| 4,481,239 | | 11/1984 | Eckner . | |
| 4,484,877 | | 11/1984 | Stucke et al. . | |
| 4,493,864 | | 1/1985 | Thomson . | |
| 4,494,776 | | 1/1985 | Press . | |
| 4,514,449 | * | 4/1985 | Budich et al. | 428/76 |
| 4,556,240 | | 12/1985 | Yoshida . | |
| 4,559,973 | | 12/1985 | Hane et al. . | |
| 4,643,457 | | 2/1987 | Press . | |
| 4,709,946 | | 12/1987 | Hunter . | |
| 4,724,186 | * | 2/1988 | Kelch | 428/344 |
| 4,733,699 | | 3/1988 | Hata . | |
| 4,904,323 | | 2/1990 | Nadeau . | |
| 4,927,184 | * | 5/1990 | Bourjot et al. | 138/141 |
| 5,104,153 | | 4/1992 | Corcoran . | |
| 5,143,407 | | 9/1992 | Cokeh . | |
| 5,305,799 | * | 4/1994 | Dal Palu | 138/109 |
| 5,348,779 | * | 9/1994 | Igarasi | 138/126 |
| 5,358,012 | * | 10/1994 | Kish | 138/137 |
| 5,413,147 | * | 5/1995 | Moreiras et al. | 138/109 |
| 5,462,780 | | 10/1995 | Richards . | |
| 5,520,223 | * | 5/1996 | Iorio et al. | 138/137 |
| 5,678,610 | * | 10/1997 | Scarazzo et al. | 138/109 |
| 5,765,285 | * | 6/1998 | Buy et al. | 138/140 |
| 5,775,378 | | 7/1998 | Auvil . | |

FOREIGN PATENT DOCUMENTS

| | | |
|---|---|---|
| 29 34 734 | 8/1979 | (DE) . |
| 30 08 532 A1 | 3/1980 | (DE) . |
| 3008532 | 10/1981 | (DE) . |
| G 91 14 251.2 U1 | 11/1991 | (DE) . |
| G 91 14 252.0 U1 | 11/1991 | (DE) . |
| 43 10 272 A1 | 3/1993 | (DE) . |
| G 93 04 568.9 U1 | 3/1993 | (DE) . |
| 44 04 492 A1 | 2/1994 | (DE) . |
| 195 07 224 A1 | 3/1995 | (DE) . |
| 195 36 698 C1 | 9/1995 | (DE) . |
| 295 15 269 U1 | 9/1995 | (DE) . |
| 196 35 951 C1 | 9/1996 | (DE) . |
| 0 024 220 B1 | 7/1980 | (EP) . |
| 0 067 919 A1 | 6/1981 | (EP) . |
| 0 084 088 A1 | 11/1982 | (EP) . |
| 0 127 127 A2 | 5/1984 | (EP) . |
| 0 154 931 B1 | 3/1985 | (EP) . |
| 0 311 400 B1 | 10/1988 | (EP) . |
| 0342181 | 11/1989 | (EP) . |
| 0 419 982 B1 | 9/1990 | (EP) . |
| 0 485 651 B1 | 11/1990 | (EP) . |
| 0 230 457 B1 | 12/1990 | (EP) . |
| 0 567 667 A1 | 4/1992 | (EP) . |
| 0 237 234 B1 | 9/1992 | (EP) . |
| 0 542 315 A1 | 11/1992 | (EP) . |
| 0 546 517 A1 | 12/1992 | (EP) . |
| 0 639 411 A1 | 3/1994 | (EP) . |
| 0644031 | 3/1995 | (EP) . |
| 0735305 | 10/1996 | (EP) . |
| 747732 | 5/1953 | (GB) . |
| 882364 | 9/1959 | (GB) . |
| 1108136 | 7/1964 | (GB) . |
| 1227163 | 5/1967 | (GB) . |
| 1321223 | 6/1969 | (GB) . |
| 59-14630 | 8/1984 | (JP) . |
| 7132565 | 5/1995 | (JP) . |
| WO 93/10962 | 11/1992 | (WO) . |
| WO 96/18840 | 12/1995 | (WO) . |
| WO 97/16299 | 5/1997 | (WO) . |
| WO 974940 | 12/1997 | (WO) . |
| WO 9822744 | 5/1998 | (WO) . |

* cited by examiner

MULTILAYER COMPOSITE PIPE FLUID CONDUIT SYSTEM USING MULTILAYER COMPOSITE PIPE AND METHOD OF MAKING THE COMPOSITE

FIELD OF INVENTION

This invention relates to a multilayer composite pipe designed to convey fluids (liquids or gases) at elevated temperatures and pressures. The multilayer composite pipe comprises a first layer made from either an amorphous or semicrysteilline thermoplastic material, an intermediate layer made from a metallic material and an outer layer made from an amorphous rigid thermoplastic material. In one embodiment of the invention, the multilayer composite pipe may be bendable. A method of manufacturing such a multilayer composite pipe is also disclosed. Furthermore, the invention comprises a fluid conduit system employing such multilayer composite pipes. The multilayer composite pipe is versatile, easily installed and may have numerous desirable properties such as chemical resistance, impact resistance and pressure bearing capability as compared to conventional multilayer composite pipes.

BACKGROUND OF THE INVENTION

Fluid conduit systems have tropically been made of ferrous metals. The metal conduit is generally provided in fixed lengths and is cut to size prior to installation. The metal conduit is then threaded in the field and mated with a coupling. The installation of such pipe is cumbersome, time intensive and expensive. Copper pipes install more quickly than ferrous metal pipes but are also more expensive than ferrous metal pipes.

Plastic pipe has also been used in fluid conduit systems. Plastic pipe can be less expensive than either ferrous metals or copper pipes. However, the plastic pipes are more flexible than either copper pipes or ferrous metal pipes and therefore need more support. The additional support necessary adds to the installation time and material costs of the entire system.

Hybrid plastic/metal pipes and fittings have been proposed for fluid conduit systems for many years. For example, U.S. Pat. No. 4,216,802 discloses a deformable composite pipe product. The product comprises a seamless inner tubular shaped layer made from a polymeric layer. The metallic material is preferably made from an alloy of copper or aluminum. The outer layer can be selected from a variety of thermoplastically processable materials such as for example rubber, nylon, thermoplastic rubber, polyurethane and the like. Preferably, the outer layer is a thermoplastically processable semicrystalline polymer such as polyvinyl chloride or a high density polyethylene composite. The polymeric material may be cross-linked to improve the properties of the composite pipe. The outer layer is preferably formed around the inner layer by means of an extrusion process. The inner and outer layers are bonded together by means of a polyamide based hot melt adhesive interposed between the two layers. The outer diameter of the outer layer is sized so that the composite tubing product can be attached without further dimensional alteration to fittings generally used to couple equivalently dimensioned pipes having a singular polymeric or metallic wall.

A three layer flexible pipe is described in European Patent Application 0 084 088 A 1. The inside layer of this pipe is made of a heat resistant material such as perfluoroethylene propylene or polyvinylidene fluoride. The intermediate layer is a metal foil such as aluminum, whereas the thicker outer layer is made of an extruded polyamide, polypropylene or a polyethylene-propylene mixture or a cross-linked polyethylene; all of which are semi-crystalline thermoplastic polymers.

A semi-rigid plastic tube with a integral metallic tubular reinforcement is described in European Patent Application 0 067 919 A1 . The semi-rigid, semi-crystalline plastic tube can be made oDf a polyolefin, polyamide or polyamide resin. The tube is enclosed by a layer of aluminum metal or alloy, which layer is welded using a laser. The external layer is an extruded layer.

European Patent Application 0 230 457 A1 discloses a composite fuel and vapor tube. The composite tube is a bendable tubular article for transport of fuels which comprises a bendable metal strip formed sleeve extending throughout the length of the article and having an adhesive layer on the other surface of the metal sleeve. A flexible plastic jacket encases the metal sleeve. Additionally, the metal sleeve has a flexible bendable tubular liner that is made of petroleum resistant materials. The metal sleeve used in the invention is preferably aluminum. The metal sleeve offers sufficient strength to dominate over the resiliency of the plastic layer when the tubing is bent to a desired configuration.

Similarly, European Patent Application 0 639 411 A1 discloses a process for manufacturing a composite tube with two or more layers of different materials. The tube preferably comprises three layers with metal sandwiched between the plastic layers, such as polyethylene or cross-linked polyethylene; both of which are semi-crystalline materials.

European Patent 0 154 931 A1 describes a composite pipe made by wrapping an extruded plastic pipe with a ductile metal sheet to form a continuous tube. The metal sheet is butt welded before it is enclosed by a further extruded plastic sheath or tube. An adhesive may be placed between the metal sheet and the outer plastic sheath. The inner extruded plastic pipe is a cross-linked polyolefin, fluorinated polymer, polyamide or an elastomer. The metal sheet used in the composite pipe is aluminum or an alloy of aluminum; whereas the adhesive is a ionomer, ethylene vinyl acetate or a modified polyethylene. This composite pipe can be shaped using bending tools. Furthermore, the pipe can be used at pressures up to 300 bars.

European Patent 0 237 234 A1 to Yasuo discloses a method of producing a composite pipe made of metal in which the inner surface of the metal hs covered by a plastic layer. According to this patent, a coiled metal sheet is formed into a cylinder. Molten resin is extruded into a cylindrical shape over the inner surface of the cylinder made from the metal. Generally, the liner is made from a fluororesin or aromatic polyester resin. In a preferred embodiment, the liner is made from a polyolefin compound in which the polyolefin is cross-linked by both hydrolysis and a radical reaction. The metal sheet is made from an aluminum alloy.

U.S. Pat. No. 4,559,973 discloses a water impervious heat shrinkable tube. The tube comprises an inner and outer layer plastic layers forming a tube and a laminated metal foil layer interposed between the inner and outer layers. The metal foil layer has a thickness of 0.1 mm. The plastic material to be laminated on both sides of the metal foil film is selected from the group consisting of polyethylene, polyvinyl chloride, saturated polyester, cross-linked polyethylene, ethylene-propylene rubber, silicon rubber, chloroprene rubber and fluoroplastic.

Similarly, International Patent Application WO/96/18840 discloses a conduit made of a multilayer material which is intended to convey a motor vehicle fluid. The conduit comprises an internal layer, an intermediate layer and an external layer. The intermediate layer comprises a thin sheet material, such as aluminum with the thickness of approximately 10–70 millimicrons. In one example, the internal layer is a polyamide pipe and the outer layer is cross-linked polyvinyl chloride.

Hybrid structures have also been proposed for fittings. For example, U.S. Pat. No. 5,143,407 to Cokeh discloses a pipe coupling device comprising a cylindrical outer layer of plastic formed with a central inwardly extending boss which coaxially supports a copper pipe extending there through and having recesses encircling the copper pipe adjacent each end of the outer layer to permit pipe to be coupled to be inserted into said recesses in a manner to encircle the copper pipe and to facilitate the joining of the pipe coupled to the outer layer. If desired, annular rubber washers are inserted into the recesses adjacent each end of the boss to provide a better seal.

U.S. Pat. No. 4,277,091 discloses a coupling joint for interconnecting the ends of metal conduit sections having plastic liners to form a continuously lined conduit and the method for making such joints. An open faced collar is used to join the ends of pipe sections to form a continuously lined conduit. The open face collar comprises an open ended cylindrical body, the outer dimensions of which substantially conform to the internal dimensions of the liner in the pipe. The open faced collar includes a radically extending flange which radiates outwardly from the end of the body to mate with the exposed face of the pipe. The open face collar is bonded to the pipe with a solvent such as methyl ethyl ketone or any suitable conventional epoxy cement. An identical open face collar is positioned within the open end of a section of a second pipe. If desired, a solvent or bonding agent may be applied to the flanges immediately prior to the assembly of the coupling to provide a sealing bond. The ends of the pipe sections to be joined are arranged coaxially with a coupling sleeve. The coupling sleeve is a relatively short section of a metal pipe having an internal diameter slightly less than the external diameter of the ends of the pipe section. The open ends of the coupling sleeve are preferably flared outwardly to aid in the insertion of the pipe sections. In the preferred embodiment:, the coupling sleeve is provided with a centrally located annular recess or groove which carries a sealing band. The sealing band is preferably the same material as the liner and open face collar and is bonded or secured within the recess by an epoxy binder or the like.

Despite many variations of hybrid and composite pipes and fittings, all of these pipes are deficient in that they do not balance the properties of both metal pipes and plastic pipes. A need still exists for a rigid, pressure bearing, impact resistant, multilayer thermoplastic composite pipe which can be easily installed. There is a great need for a multilayer composite pipe that balances both the properties of metal pipes and plastic pipes. Furthermore, a need exists for a fluid conduit system in which such a multilayer composite pipe can be used.

SUMMARY OF THE INVENTION

The present invention is directed to a multilayer composite pipe. This multilayer composite pipe comprises an inner hollow conduit made of a rigid, thermoplastic material, with a metallic intermediate layer surrounding the inner hollow conduit. An amorphous thermoplastic material surrounds the intermediate metallic layer. This multilayer composite pipe is impact resistant, and can possess both temperature and pressure bearing capabilities not found with conventional thermoplastic pipes and fittings. Additionally, the multilayer composite pipe can be made into various sizes, including large diameter pipe which was hereto not available with many of the conventional composite pipe systems. The multilayer composite pipe can be easily cut in the field as well as easily installed.

In one embodiment of this invention, the multilayer composite pipe can be bendable. In another embodiment, the multilayer composite pipe can be formed into a large diameter composite pipe structure. In yet another embodiment, fewer hanger spacers are needed to install the multilayer composite pipe than with conventional plastic pipe composed of the same plastic. In still yet another embodiment, the irultilayer composite pipe may be resistant to many chemicals, such as oxygen and aqueous chlorine, acids and bases.

It is also possible to use this unique multilayer composite pipe in a fluid conduit system. The composite multilayer pipe can be joined by mechanical joints, push fit joints, conventional fittings or fittings specifically designed to mate with the composite pipe using solvent cement or other bonding means such as, for example, heat fusion to form a flu:d conduit system. Optionally, an insert is included between the fitting and the multilayer composite pipe to provide for a safer and more reliable pressure bearing joint.

In yet another aspect, this invention is a method of making the multilayer composite fluid conduit in which an inner hollow conduit is formed from a thermoplastic polymer by extrusion. A layer of adhesive is applied to the outside surface of the inner hollow conduit. A metallic intermediate layer is formed around the inner hollow conduit. A second layer of adhesive is placed over the outer surface of the metallic intermediate layer and a layer of an amorphous thermoplastic polymer is extruded on the outside of such composite structure.

For a better understanding of these and other aspects and objects of the invention, references should be made to the following detailed description taken in conjunction with the accompanying drawings.

DETAILED DESCRIPTION OF THE PREFERRED EMBODIMENTS

Figure 1:
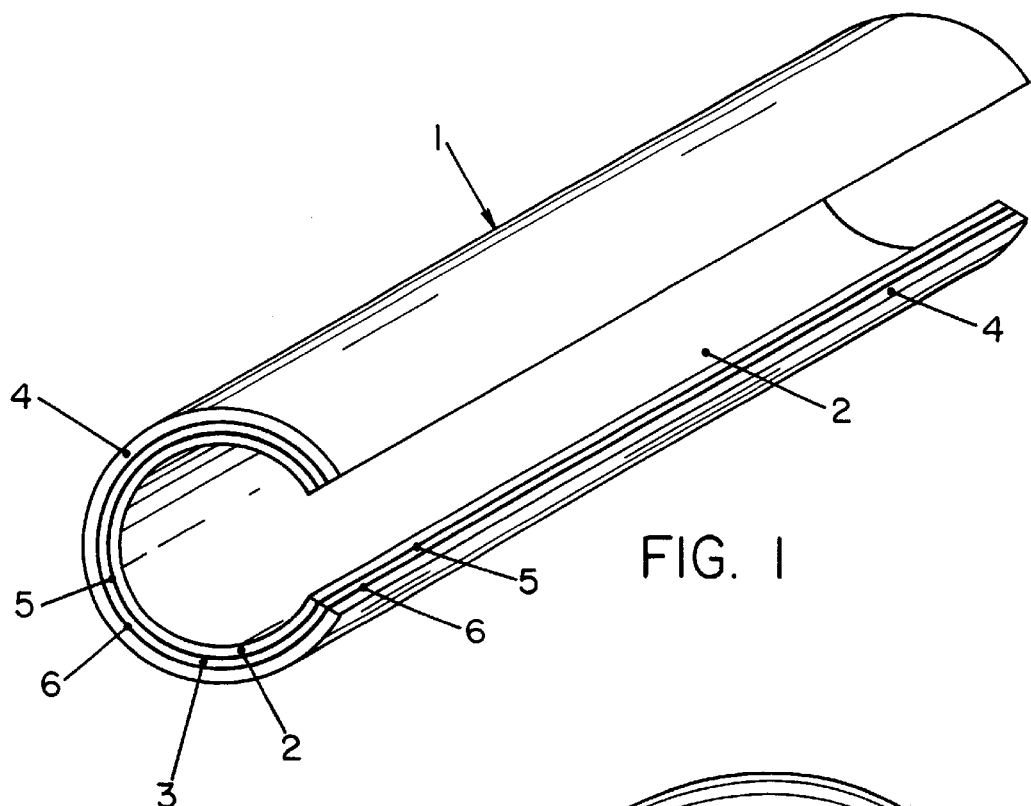
FIG. 1 is a sectional view of the preferred embodiment of the composite pipe.

Turning now to the drawings, the present invention is a multilayer composite pipe. The multilayer composite pipe 1, as shown in FIG. 1, comprises a first layer formed into hollow conduit 2, a metallic intermediate layer, 3, which surrounds the first layer and a third layer composed of a amorphous thermoplastic polymer 4 surrounding the metallic intermediate layer. An adhesive layer 5 is placed between the outer surface of the first layer and the inner surfaces of the metallic intermediate layer, as well as, a second adhesive layer 6 between the outer surface of the metallic intermediate layer and the inner surface of the third outer layer.

The hollow inner conduit 2 is formed by a hollow length of a pipe having a completely closed tubular outer surface and an opposing closed tubular inner surface. The hollow inner conduit can be made either from a rigid semicrystalline Thermoplastic plastic or a rigid amorphous thermoplastic.

A rigid amorphous thermoplastic material is a thermoplastic material which can be stretched beyond its yield point. A rigid amorphous thermoplastic as used herein is a thermoplastic material having a modulus of elasticity, either in flexure or in tension, greater than 300,000 psi at 23° C. and 50% relative humidity when tested in accordance with ASTM Test Methods D790, D638, or D882. Generally, amorphous polymers have less than fifteen percent crystallinity. Further information on amorphous thermoplastic polymers can be found in Alfrey, Jr., *Mechanical Behavior of High Polymers*, John Wiley & Sons, Inc., (New York, 1965), pp. 510–515.

Examples of some suitable amorphous thermoplastics which can be used to form the first layers as defined herein include chlorinated polyvinyl chloride ("CPVC"), polyvinyl chloride ("PVC"), polyvinylidene fluoride ("PVDF"), polyether sulfone and polyphenyl sulfide, polycarbonate, acrylics such ais methyl methacrylate, and styrenics such as acrylonitrile styrene butadiene polymers ("ABS"). The most preferred amorphous thermoplastic is CPVC.

Generally, the thickness of the inner hollow conduit will be dependent upon the desired final thickness of the thermoplastic composite pipe. Preferably, the outer diameter of inner hollow conduit should be greater than the bore of the pipe by at least 0.1 mm. The most preferred amorphous thermoplastic used to form the hollow inner conduit is CPVC. In one embodiment, the CPVC is one to two times as thick as the metallic intermediate layer. In the most preferred embodiment, the CPVC layer is 1.5 timres as thick as the metallic intermediate layer. In the most preferred embodiment, the CPVC forming the hollow inner conduit has a thickness of approximately 0.6 mm. The hollow inner conduit is preferably formed by an extrusion process although any other process may be used to form the hollow conduit.

The first adhesive layer used between the outer surface of the first layer and the inner surface of metallic intermediate layer is any suitable bonding agent that can be used to permanently bond the thermoplastic polymer forming the inner hollow conduit to the metallic intermediate layer. The adhesive is recessary since the thermoplastic material of the inner hollow conduit itself will not bond to the metallic inner layer. Preferably, the bonding agent can adapt to different coefficients of thermal expansion due to the differences in the materials between the two layers. The adhesive can be sprayed, extruded, brushed or applied in any manner to the outer surface of the inner hollow conduit. If the adhesive is sprayed, the adhesive can be diluted if so recommended by the manufacturer. The :first adhesive is preferably applied to the entire outer surface of the inner layers. Alternatively, the first: adhesive layer can be applied as a series of rings evenly spaced around the outer surface of the inner layers.

Generally, the first adhesive is applied to yield a layer having a thickness of about 0.01 mm to about 0.5 mm. The preferred thickness of the first adhesive layer is 0.1 mm.

The first adhesive can be any adhesive material used in the art. Examples of suitable adhesives include polyvinyl chloride and polyvinyl chloride copolymers, polyurethanes or other isocyanide based polymers, chloroprene and its copolymers, epoxides, acrylates, polyethylene copolymers. If polyethylene copolymers are used, it is preferred that the comonc,mer is a vinyl acetate or maleic anhydride. The preferred adhesive layer when used in conjunction with a CPVC inner hollow conduit is a polyurethane. Most preferably, Estane 58271 polyurethane, available from The B.F. Goodrich Company is used. Estane is a registered trademark of The B.F. Goodrich Company.

The second layer of the multilayer composite pipe can be formed from any metallic material, provided that it has a tensile strength that is greater than the tensile strength of the plastic. Examples of suitable metallic intermediate layers include ferrous materials, copper, stainless steel, brass, and aluminum materials. In addition, alloys can be used so long as they provide support to the thermoplastic materials used to form the first and the third layers of the composite pipe structure and meet the objectives of thte invention.

The metallic intermediate lagger is preferably made from a smooth metallic material. Generally, the thickness of the metallic intermediate layer should be in the range of 0.01–40 mm. Preferably, the thickness can be in the range of 0.1 to 4.0 mm. The metallic intermediate layer can be in the form of a conduit with open ends which surrounds the inner hollow conduit. Alternatively, as described below in further detail, the metallic intermediate layer can be formed from metal sheeting wrapped around the inner hollow conduit. The sheeting material can be joined together by a method such as welding. The most preferred material used as the metallic intermediate layer is aluminum. If the metallic layer is not welded, it must be overlapped when placed around the first layer. The metallic intermediate layer can overlap due to wrapping of the metal at an angle or just plain overlapping of the metal in which opposing sides of the material abut each other. Preferably, when aluminum is used, the thickness is in the range of 0.5 to 5.0% of the outer diameter of the multi-layer composite pipe. In the most preferred embodiment, the aluminum layer is 0.2 mm thick.

A second adhesive layer is used in the multilayer composite pipe and is placed on the outer surface of the second layer. This adhesive used in the second layer can be any suitable bonding agent that can be used to permanently bond the outer surface metallic intermediate layer to the inner surface of outer thermoplastic layer. Preferably, the bonding agent can adapt to different coefficients of thermal expansion due to the differences in the materials between the two layers. The adhesive can be sprayed, brushed, extruded, or applied in any manner to the surface. The adhesive can be applied to the entire outer surface of the second layer. Alternatively, the adhesive layer can be applied as a series of rings evenly spaced around the outer surface of a second material. The adhesive is applied generally to a thickness of about 0.01 to about 0.5 mm, preferably, 0.1 mm.

This second layer of adhesive can be the same as the first layer of the adhesive used between the outer surface of the inner hollow conduit and the inner surface of the second layer. Alternatively, the adhesive can also be different so long as a bond is established between the outer surface of the metallic intermediate layer and inner surface of the third layer. Examples of suitable adhesives include polyvinyl chloride and polyvinyl chloride copolymers, polyurethanes or other isocyanide based polymers, chloroprene and its copolymers, epoxides, acrylates, polyethylene copolymers. If polyethylene copolymers are used, it is preferred that the comonomer is a vinyl acetate or maleic anhydride. The preferred adhesive layer when the third layer is chlorinated polyvinyl chloride is Estane 58271 polyurethane, available from The B.F.Goodrich Co. The methods of application as well as the thickness used for this second adhesive layer are as described above with respect to the first adhesive layer.

The outer layer of the multilayer composite pipe is formed from a rigid plastic, as defined above. Preferably, the outer layer is made from a rigid plastic which is an amorphous thermoplastic polymer. Suitable amorphous thermoplastics which can be used to form the outer layer of the multilayer composite pipe as defined herein include chlorinated polyvinyl chloride ("CPVC"), polyvinyl chloride ("PVC"), polyvinylidene fluoride ("PVDR"), polyether sulfone and polyvinylidene sulfide polycarbonate, acrylics such as methyl methacrylate, and styrenics such as acrylonitrile styrene butadiene ("ABS"). In one embodiment, the outer layer of the multilayer composite pipe can be made from the same material as the inner hollow conduit. Alternatively, the outer layer can be made from a different amorphous thermoplastic material than the inner hollow conduit if the inner hollow conduit is made from an amorphous thermoplastic material. However, care must be taken in choosing the materials to ensure that the multilayer composite pipes can be joined together to form a composite system. Generally, the thickness of the outer layer will be dependent upon the desired final thickness of the multilayer composite pipe. Preferably, the outer layer will have a thickness as compared to the metallic intermediate layer in the range of 1:5 to 5:1. Preferably, thickness of the outer layer when compared to the metallic intermediate layer is in the ratio of 1:3 to 3:1. In the most preferred embodiment of the multilayer composite pipe, the outer layer is formed from CPVC. In the most preferred embodiment, the CPVC formed the outer layer has a thickness of approximately 0.6 mm.

Figure 1A:
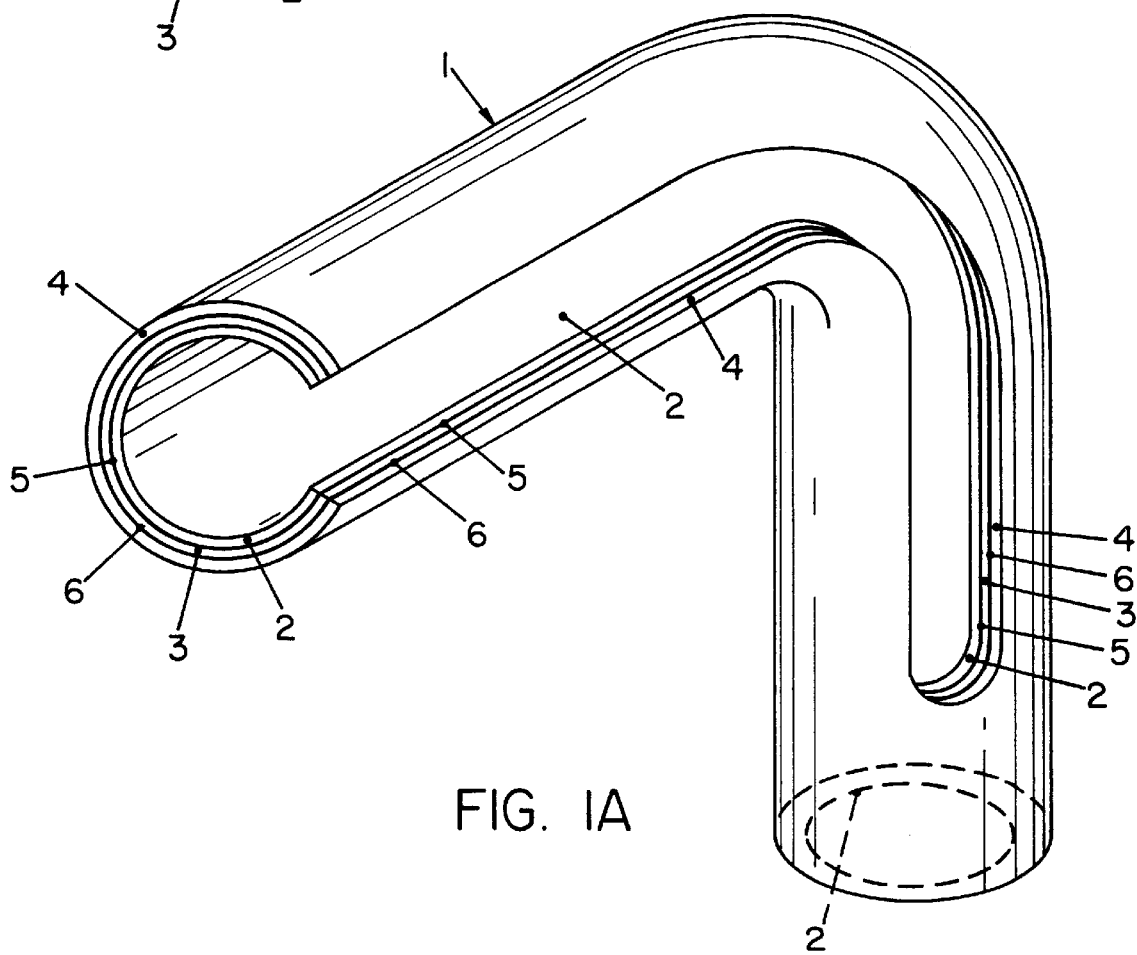
FIG. 1A is a sectional view of a composite pipe of the instant invention which is bent.

Preferably, the multilayer fluid conduit is provided with outer diameters conforming to nominal piping or tubing outer dimensions, such as, for example, Schedule 40 and/or 80 as defined in ASTM F438 or SDR 11 or defined in ASTM D2846 or other ASTM standards or DIN 8063, and 8079 standards and/or BS 7291 standards. This is preferred so that conventional fittings can be used in a multilayer fluid conduit system of the instant invention. Pipe and tubing are normally sized by specified outer diameters. The fittin, with which they are used are sized internally in relation to the standard outer diameters specified for the pipes to be received in the fittings. The only limitation in size of the multilayer composite pipe of the instant invention is the ability to bend the pipe, if such a bend is desired. That means that the diameter of the composite pipe cannot be so large that the composite pipe structure cannot be bent. A schematic example of a bent pipe of the instant invention is shown in FIG. 1A. However, all the layers should be sufficiently thick to provide the strength and rigidity needed for a safe, leak proof system for the intended uses composite pipe in a fluid conduit system, whether the fluid is a gas or a liquid.

The most preferred embodiment of the present invention comprises a multilayer composite pipe in which the inner hollow conduit is made from CPVC. The metallic intermediate layer is aluminum foil, and the outer layer is also CPVC. The thickness of the aluminum layer is equal to about 1 to about 5 percent of the outer diameter of the multilayer composite pipe. The chart listed below illustrates the various pipe sizes of the preferred embodiment of the instant invention. The measurement of the layers as well as the total measurement are listed in mm. The pipe sizes are based on the DIN 8079 Standard.

| Pipe Size | CPVC | Aluminum | CPVC | Total |
|---|---|---|---|---|
| 16 | 0.6 | 0.4 | 0.6 | 1.6 |
| 20 | 0.9 | 0.6 | 0.9 | 2.4 |
| 25 | 1 | 0.7 | 1 | 2.7 |
| 32 | 1.3 | 0.9 | 1.3 | 3.5 |
| 40 | 1.6 | 1.1 | 1.6 | 4.3 |
| 50 | 2.1 | 1.4 | 2.1 | 5.6 |
| 63 | 2.6 | 1.7 | 2.6 | 6.9 |

Most preferably, the aluminum layer is 1.5% of the outer diameter of the pipe. The ratio of the thickness of either CPVC layer to the thickness of aluminum in the pipe is 1:5 to 3:1. Most preferably, the ratio of the thickness of the CPVTC to the thickness of aluminum in the preferred multilayer composite pipe is 3:2. The adhesive used in this preferred embodiment on both sides of the metallic intermediate layer is Estane 58271 polyurethane, available from The B.F.Goodrich Company, as described above in further detail.

Figure 2:
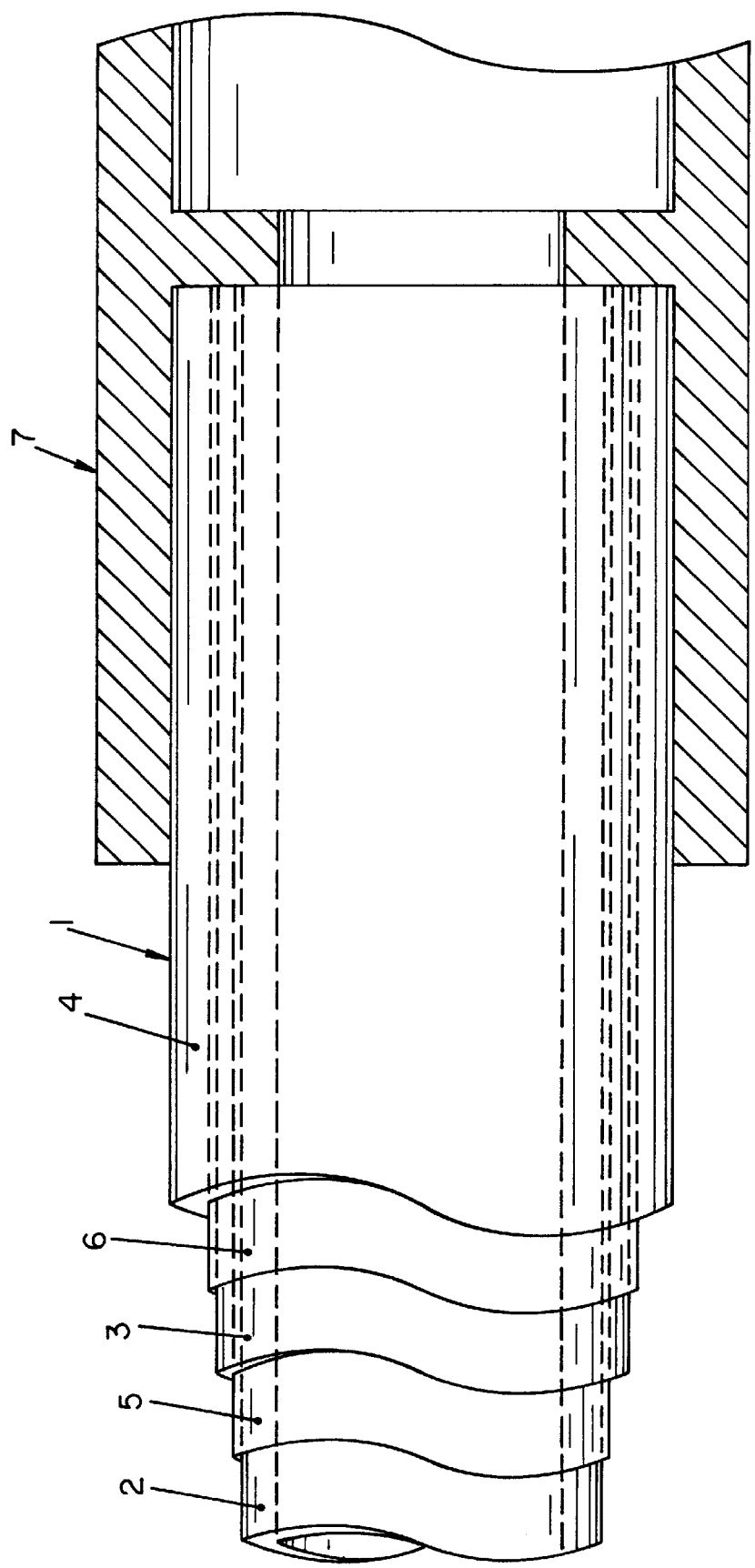
FIG. 2 is a depiction of a system of a multilayer composite pipe and fitting joined together.

FIG. 2 diagrammatically depicts a portion of a fluid conduit system of the present invention incorporating a multilayer composite pipe. A plurality of the multilayer composite pipes of the instant invention are connected end to end by a plurality of joints and/or fittings 7. These joints and/or fittings include, but are not limited to, adapters, straight couplings, elbows, bushings, crosses, caps, plugs, flanges, and/or unions.

In one embodiment of the invention, conventional fittings or mechanical joints can be used to join the multilayer composite pipe. Examples of mechanical joints which can be used include push fit fittings to provide a leak proof joint or to provide a leak proof assembly. Examples of suitable push fit fittings include the Universal fitting from Genova Plastics, Part PI from John Guest as well as Straight Coupling TI part from IMI Yorkshire fittings.

Figure 6A:
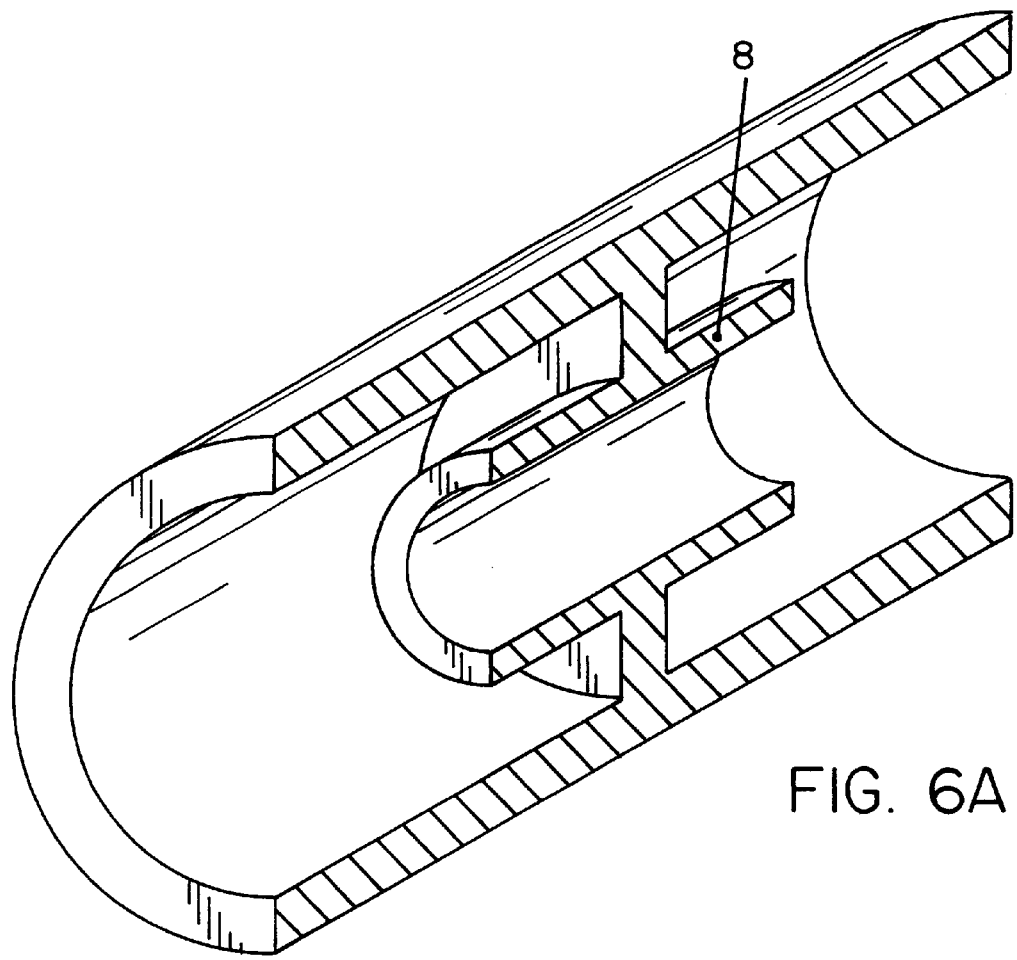
FIGS. 6A and 6B are cross sectional views of a modified fitting which can be used in the instant invention.
Figure 6B:
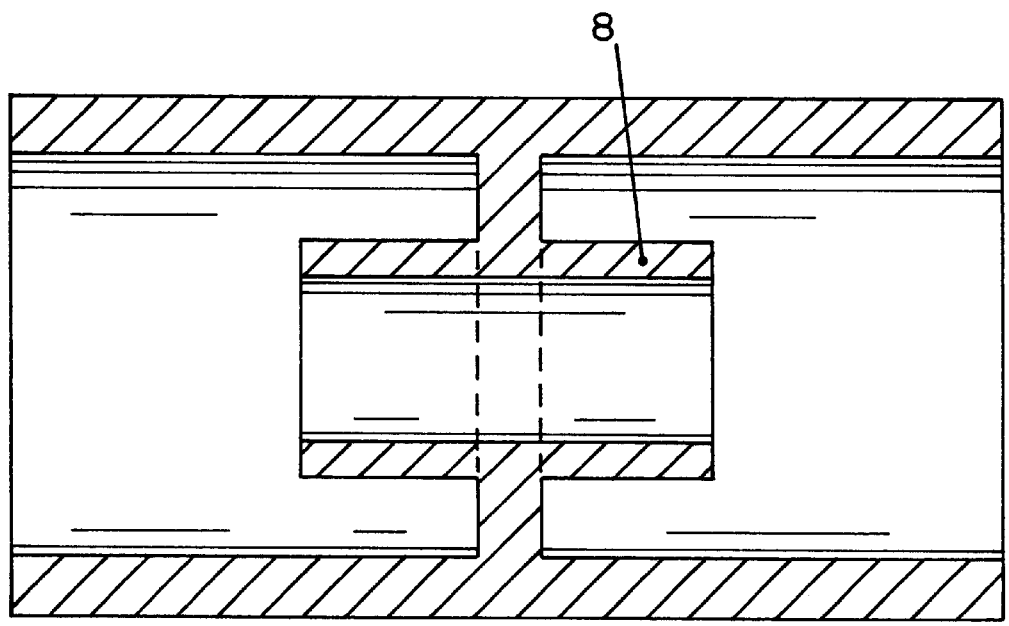

With the non-mechanical types of fittings, solvent cements can be used to join the fittings. Any conventional solvent cement applicable to the particular materials used to form the multilayer composite pipe and the fitting can be used. Alternatively, a heat fusion bonding system can be used to join the fitting with the multilayer composite pipe. Such systems are described in the ASTM F412, under the definition of heat fused joints. Any conventional heat fusion bonding method can be used. In another embodiment, as shown in FIGS. 6A and 6B, the fittings can be modified to contain a lip portion 8 that extends axially out from the interior of the fitting to matingly join the inner surface of the hollow tube conduit which forms the inner layer. A solvent cement or heat fusion can be used to joint this type of fitting to the multilayer composite pipe.

Figure 3A:
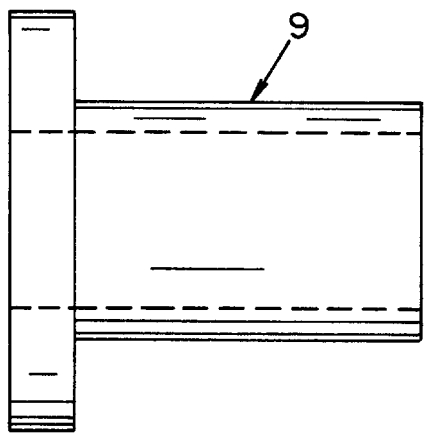
FIGS. 3A, 3B, and 3C are schematic views of the insert bushing that can be used to join the multilayer composite pipe with the conventional fittings.
Figure 3B:
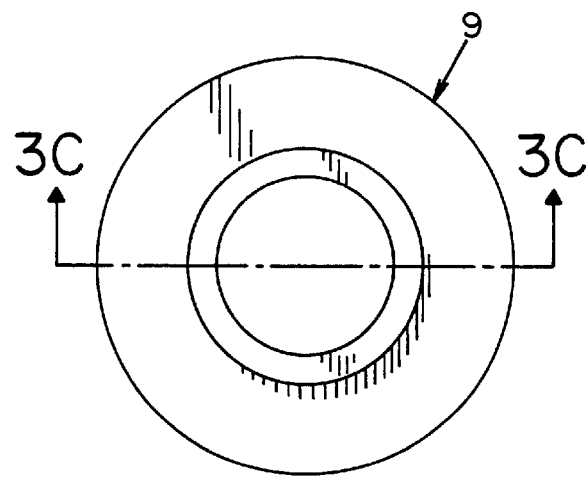
Figure 3C:
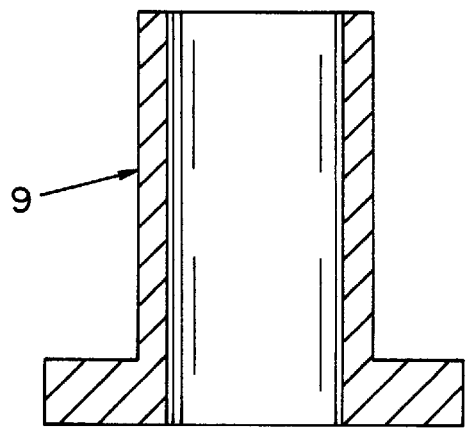

FIGS. 3A, 3B and 3C illustrate the insert or bushing 9 which is optionally used to join the multilayer composite pipe of the instant invention and conventional fittings (either conical or cylindrical). The insert comprises an open ended, hollow cylindrical body with a radically extending flange which radiates outwardly from the end of the body. The outer diameter of the inner hollow body of insert should be less than the inner diameter of the multilayer composite pipe, provided, however, that the difference in the outer diameter of the pipe and the inner diameter of the pipe does not exceed that suggested in ASTM D2846. The flanged portion is configured to have the same outer diameter as the multilayer composite pipe. An adhesive can be used to permanently bond the inner surface of the mulitlayer composite pipe to the outer surface of the hollow cylindrical body of the insert. Preferably, this insert is made from the same material as the inner hollow conduit.

Figure 4:
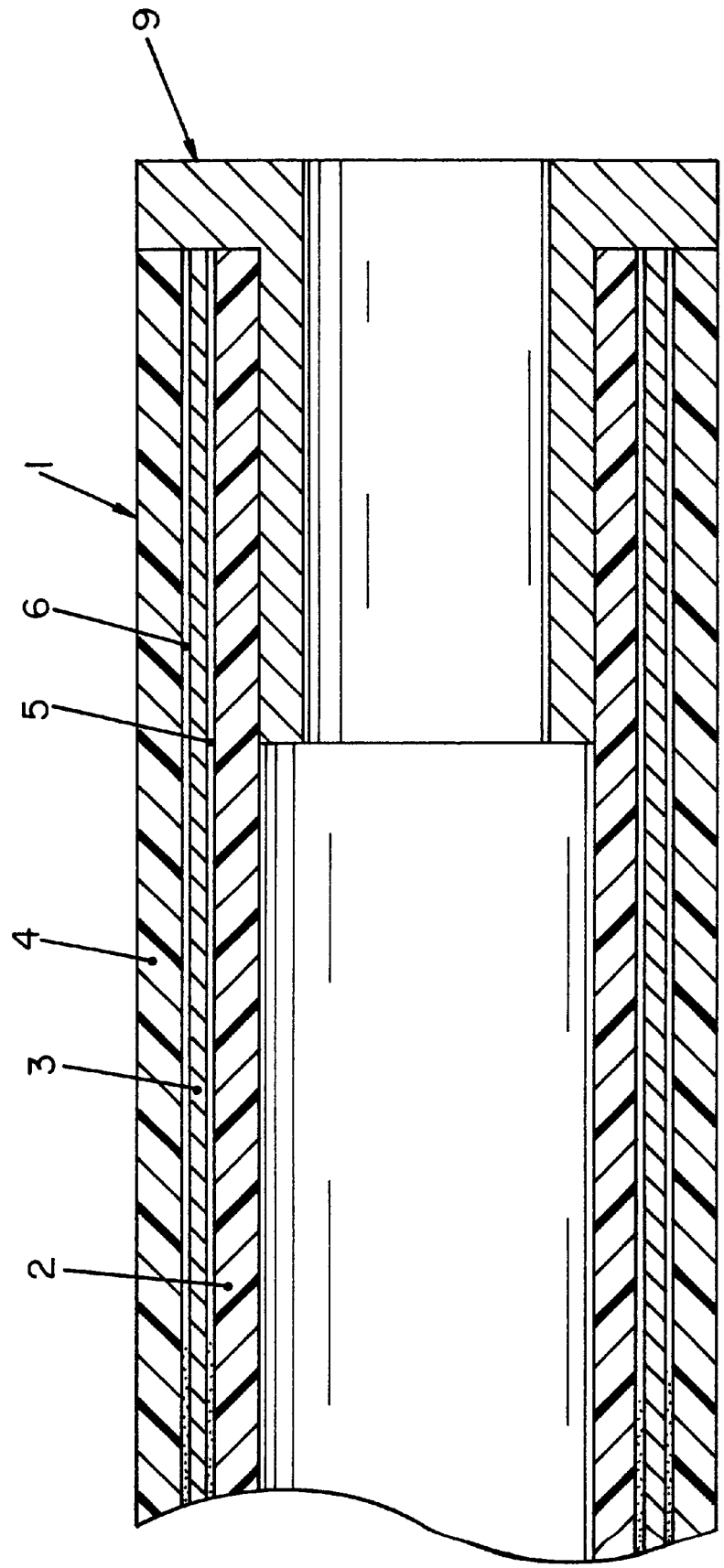
FIG. 4 is a cross sectional view of the insert bushing and multilayer composite pipe as joined together.

The solvent cement used to bond the inner hollow conduit with the hollow cylindrical body of the insert can be any suitable bonding agent that can be used to permanently bond the two layers. The solvent cement can be sprayed, brushed or applied in any manner to the outer surface of the insert. Alternatively, the solvent cement can be applied to the inner surface of the hollow inner conduit. Any solvent cement can be used provided a bond can be established between the desired surfaces. The preferred adhesive layer complies with the requirements of ASTM F493 if the first and third layers of the multilayer composite pipe are CPVC. Examples of suitable solvent cements are CPVC solvent cements available from IPS, Oatey, Verhagen and/or Henkel. The multilayer composite pipe with an insert is then joined with a conventional fitting with the use of a bonding agent as shown in the cross sectional view of FIG. 4.

Any type of bonding agent suitable for thermoplastic materials can be used to join the multilayer composite pipe containing an optional insert with a fitting provided that the bonding agent permanently bonds the surface of the multilayer composite pipe to the surface of the fitting and provides for a leak-free joint. For CPVC pipe, these bonding agents include one-step solvent cements and two-step solvents cements. Examples of suitable bonding agents for multilayer composite pipes that contain CPVC include those which comply with the requirements of ASTM F493 and remain leak proof. The bonding agents are applied directly and are suitable for ambient temperature use (0° F. (−18° C.) to 210° F. (99° C.)).

In one embodiment of the invention, the multilayer composite pipe of the instant invention can be bent anywhere from 1° to 180°. The multilayer composite pipe can be bent by any means which can be used to form a small radius bend so long as such means does not cause the pipe to kink. Preferably, a tube bender is used to bend the multilayer composite pipe structure. Any tube bender available to those in the art for bending metal pipe can be used. Generally, any commercial tube bender can be used. For example, Tube Bender H824 from the Lakeland Manufacturing Company, as well as, the Greenlee 181 Conduit Bender from the Greenlee :ompany can be used. A bent composite pipe according to the instant invention is shown in FIG. 1A.

In an alternative embodiment of the instant invention, the multilayer composite pipe, as well as, the optional insert is heat fused to the fitting. That is, the thermoplastic layers are heated to a temperature above those at which the material softens. The layers of the composite pipe (as well as the optional insert) are then joined to the fitting. Any known heat fusion technique can be used.

Figure 5:
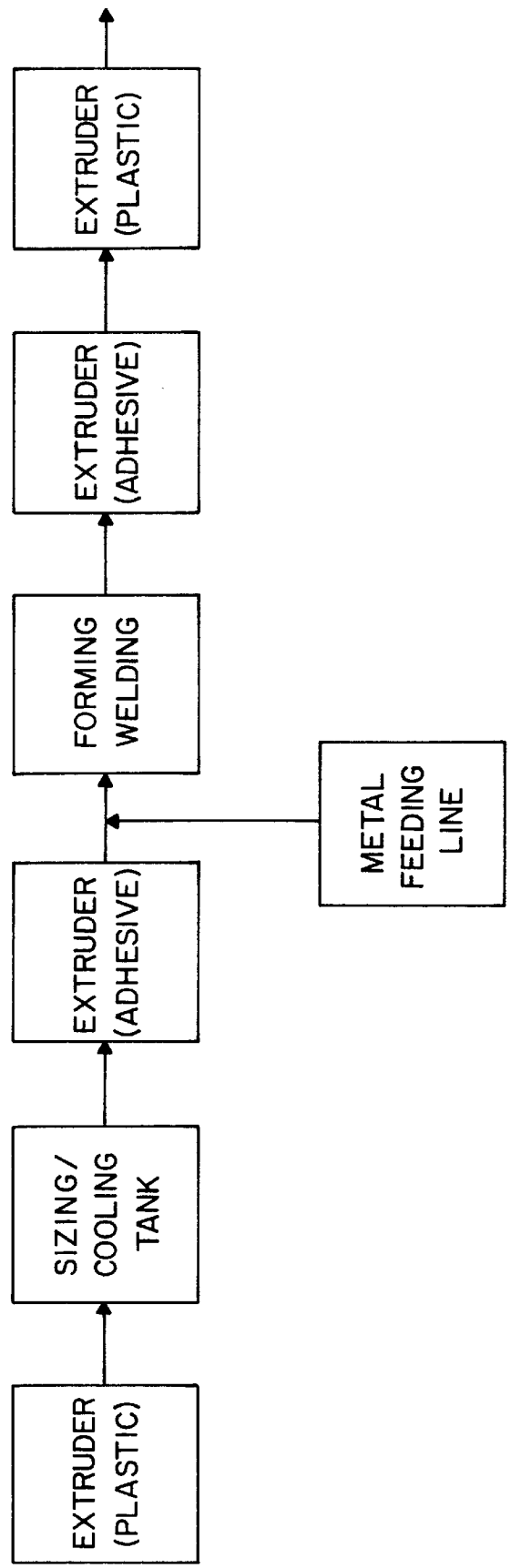
FIG. 5 is a schematic view of one possible embodiment to manufacture the multilayer composite pipe of the instant invention.

FIG. 5 depicts in block form the suggested steps of one method for fabricating the multilayer composite pipe of the instant invention. Machines that perform these steps are commercially available from Kuhne Ummantelungstechnik GmbH and Swiss CAB SA.

In the method of manufacturing the multilayer composite, the metal strip is prepared first. Care is taken to ensure that the metal strip does not have any grease on it. Then, the hollow inner conduit is extruded. A twin screw extruder is preferably used if the hollow inner conduit is made from CPVC powder, the extrudate temperature is in the range of about 400 to 450° F., and preferably from about 415 to 430° F. Once formed, the hollow inner conduit can be moved through the extrusion head of a second extruded. This can be accomplished in a variety of ways including pushing, pulling, or preferably, a combination of the two. Next, an appropriate adhesive layer is applied to the outer surface of the hollow inner conduit by any suitable means known in the art in an adhesive applying step. Extruding the adhesive on the entire outer surface of the hollow inner conduit is preferred, although the adhesive can be brushed, sprayed or rolled onto the pipe.

The metal strip that was prepared in the first step is then shaped around the outer surface of the inner hollow conduit and formed into a conduit. The metal strip can be welded together by any known means to form a conduit surrounding the inner hollow conduit. Examples of welding include laser welding and arc welding. Preferably, the welding is done in such a manner so as to avoid any overlapping of the metal layer. A gap between the metallic intermediate layer and the underlying adhesive of less than 2.0 mm is preferred. For the embodiment in which there is a finite gap and the metallic intermediate layer is welded, the metal needs to be reduced (drawn down) once it has been welded, and if necessary, heated to activate the adhesive to form a trilayered conduit. Details of the draw down process depend upon the thickness and type of metal and are generally known in the art. Next, a second layer of adhesive is applied to the outer surface of the metallic intermediate layer which was formed into the conduit. An outer layer of thermoplastic material is then extruded on the outside of the metallic intermediate layer having an adhesive coating. Alternatively, both the second adhesive layer and the amorphous thermoplastic outer layer can be coextruded.

Alternatively, a preformed rigid thermoplastic pipe can be coated with an adhesive. At metallic intermediate layer can be placed on the adhesive coated layer. A second layer of adhesive is then applied to the outer side of the metallic intermediate layer. An outer layer can then be extruded on top of the metallic intermediate layer. Optionally, the second adhesive layer, as well as, the thermoplastic layer can be coextruded in a single step using a coextrusion die.

The multilayer composite pipe of the instant invention has the advantages of plastic pipe of the comparable plastic, and additional properties. For example, the multilayer composite pipe can be cut to any length in the field using common wheel cutters. The cut end is preferably deburred, and the thermoplastic layer(s) may be chamfered for the ease of assembly. No threading or grooving or other disruption of the pipe ends is required. A bonding agent is simply applied around the end of the conduit on the exposed thermoplastic layer and/or on the exposed innermost surface of the fitting which is formed by an exposed thermoplastic layer. The pieces are joined by inserting the multilayer composite pipe and with the optional insert in the fitting open end and twisting to distribute the bonding agent. The resulting bonded joint will cure and be pressure supportive within minutes using the bonding agents preferred.

The multilayer composite pipe and conduit system of the instant invention offer significant benefits in ease of use over other known metal, plastic or composite pipe systems. The multilayer composite pipe offers greater strength and rigidity at reduced wall thickness than plastic pipe made of comparable material. Additionally, one embodiment of the multilayer composite pipe can be easily bent around a tight radius with a conventional pipe bender thereby, decreasing the number of joints that need to be used in the fluid conduit system. Furthermore, the multilayer composite pipe can be coupled into a fluid conduit system very easily with less skilled labor and without the expense of threading equipment, flaring equipment, torches, or crimping systems or other expensive mechanical fitting coupling systems.

There are many uses of the multilayer composite pipe. For example, the multilayer composite pipe can be used in any fluid conduit system, including, but not limited to, water heaters, fire sprinkler systems, underslab installations for hot and cold water, central heating systems, pressurized air systems, plumbing systems, gas transportation, underfloor heating, industrial fluid systems, and underslab heating systems.

EXAMPLE

The inner conduit was formed of TempRite 88709 TAN 309 CPVC (TempRite is a registered Trademark of The B.F.Goodrich Company), available from The B.F.Goodrich Co. The CPVC was extruded on a CM-55HP extruder from Cincinnati Milacron into pipe having a wall thickness of 0.6 mm and outer diameter of 24 mm. Zones 1–5 of the extruder were set at 360° F. (182° C.) as was the screw oil temperature. The die temperatures were set at 365° F. (185° C.). The screw speed was 9 rpm. The feed motor was run at 100 rpm and the pipe extruded at 45 lbs./hr (20 kg./hr.).

Next, Estane 58271 polyurethane adhesive was extruded over the inner conduit using a Davis Standard 1.5 in. single screw extruder with temperatures set at 380° F. The polyurethane was extruded to a thickness of 0.1 mm. The screw speed was set at 20 rpm.

An aluminum layer, aluminum 3003 (0.2 mm thick) was formed over the polyurethane and CPVC layers of the pipe using a Uniwema machine from Alcatel equipped with laser welding capabilities. The aluminum layer was formed to have a 0.8 mm gap between its inner surface and that of the underlying adhesive, welded and drawn down to an outer diameter of 24.3 mm.

Estane 58271 polyurethane adhesive was extruded over the aluminum layer using a Davis Standard 1.5 in. single screw extruder with temperatures set at 380° F. (193° C.). The adhesive was extruded to a thickness of 0.1 mm. The screw speed was 20 rpm.

The outer layer of CPVC, 0.6 mm of TempRite 3205 TAN 309, was extruded over the 4-layered pipe using a 1.5 in. Davis Standard single screw extruder with temperatures set at 400° F. (204° C.) to produce the 5 layer 25 mm composite pipe. The screw speed was 20 rpm.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive; and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A fluid conduit system comprising:
   (a) multilayer composite pipes corriprising an inner layer of an amorphous, solvent cementable thermoplastic material having a completely closed, tubular outer surface; a metallic intermediate layer and an adhesive layer between the inner layer and the metallic intermediate layer; an outer layer of in amorphous, solvent cementable thermoplastic essentially surrounding the metallic intermediate layer, and an adhesive layer between the metallic intermediate layar and the outer layer;
   (b) a fitting; and
   (c) optionally, an insert having an open ended hollow cylindrical body with an extending flange which radiates outwardly from the end of the open ended hollow cylindrical body, having an outer diameter less than the inner diameter of the multilayer composite pipe, such that said insert fits inside said composite pipe.

2. A fluid conduit system of claim 1, wherein:
   (a) the multilayer composite pipe comprises an inner layer of chlorinated polyvinyl chloride, a metallic intermediate layer of aluminum and an outer layer of chlorinated polyvinyl chloride wherein said multilayer composite pipe has an overall diameter of from about 16 mm to about 110 mm, and wherein said aluminum layer forms about 1 to 5% of the outer diameter of said pipe, the ratio of the thickness of the outer layer to the metallic intermediate layer is in the range of 1:5 to 5:1, and wherein the ratio of the thickness of the inner layer to aluminum is between 1:5 and 5:1; and
   (b) a fitting mounted on an open end of the multilayer composite pipe so as to form a leak-proof sealed joint at one end of the multilayer composite pipe directly between the multilayer pipe and the fitting.

3. A fluid conduit system of claim 2, wherein:
   (c) the fitting is a push fit fitting or a conventional fitting.

4. A fluid conduit system as claimed in claim 2, wherein said fitting and said multilayer composite pipe are joined by a solvent cement to form said leak proof seal.

5. A system of claim 4, wherein said thermoplastic is selected from the group consisting of chlorinated polyvinyl chloride, polyvinyl chloride or polyvinylidene fluoride and the metallic layer is aluminum.

6. A system of claim 4, wherein said inner layer and said outer layer of the multilayer composite pipe are 0.6 mm thick and said metallic intermediate layer is 0.2 mm thick.

7. A system of claim 4, wherein said multilayer composite pipe has an overall diameter of from about 16 mm to about 100 mm, and wherein said metallic layer forms about 1 to 5% of the outer diameter of said pipe, the ratio of the thickness of the outer layer to the metallic layer is in the range of 1:5 to 5:1, and wherein the ratio of the thickness of the inner layer to metallic layer is between 1:5 and 5:1.

8. A system of claim 7, wherein both the inner layer and the outer layer are made of a thermoplastic material selected from the group consisting of chlorinated polyvinyl chloride and the metallic layer is aluminum.

9. A system of claim 7, wherein the fitting is a conventional fitting and the system has an insert.

10. A system of claim 7, wherein the fitting is a push fit fitting and the system has an insert.

11. A system of claim 7, wherein the fitting is a modified fitting and the system has not insert.

12. A multilayer composite pipe comprising an extruded inner layer of an amorphous or semi-crystalline solvent cementable thermoplastic material having a completely closed, tubular outer surface, a metallic outer layer formed from a strip of metal, and an adhesive layer between the inner layer and the metallic outer layer.

13. A multilayer composite pipe according to claim 12, wherein said inner layer thermoplastic is selected from the group consisting of chlorinated polyvinyl chloride, polyvinyl chloride or polyvinylidene fluoride and the metallic layer is steel.

14. A fluid conduit system comprising:
   (a) multilayer composite pipes comprising an inner layer of an amorphous, solvent cementable thermoplastic material having a completely closed, tubular outer surface; a metallic outer layer and an adhesive layer between the inner layer and the metallic outer layer,
   b) a fitting; and
   (c) optionally, an insert having an open ended hollow cylindrical body with an extending flange which radiates outwardly from the end of the open ended hollow cylindrical body, having an outer diameter less than the inner diameter of the multilayer composite pipe, such that said insert fits inside said composite pipe.

15. A fluid conduit system according to claim 14, wherein said inner thermoplastic layer is selected from the group consisting of chlorinated polyvinyl chloride, polyvinyl chloride or polyvinylidene fluoride and the metallic layer is steel.

16. A fluid conduit system according to claim 14, wherein said fitting is a conventional fitting and said system has an insert.

17. A fluid conduit system according to claim 14, wherein the fitting is a push fitting and the system has an insert.

18. A fluid conduit system according to claim 14, wherein said fitting is a modified fitting and said system has no insert.

19. A process of making a multilayer composite pipe comprising the steps of:
   (a) extruding an inner layer of said mulhilayer composite pipe in the form of a conduit formed from a thermoplastic material, said conduit having an outer surface;
   (b) applying an adhesive layer on the outer surface of said conduit; and
   (c) forming a metallic outer layer from a strip of metal.

20. A process according to claim 19, herein said thermoplastic material is selected from the group consisting of chlorinated polyvinyl chloride, polyvinyl chloride, or poiyvinylidene fluoride.

21. A process according to claim 19, wherein said metallic outer layer is steel.

* * * * *